(12) United States Patent
Chen

(10) Patent No.: US 6,527,346 B2
(45) Date of Patent: Mar. 4, 2003

(54) REMOVABLE VEHICLE WHEEL RING

(76) Inventor: James Chen, 1430 Boros Ct., La Habra, CA (US) 90631

( * ) Notice: Subject to any disclaimer, the term of this patent is extended or adjusted under 35 U.S.C. 154(b) by 51 days.

(21) Appl. No.: 09/903,906

(22) Filed: Jul. 11, 2001

(65) Prior Publication Data

US 2003/0011237 A1 Jan. 16, 2003

(51) Int. Cl.[7] .................................................. B60B 7/01
(52) U.S. Cl. ............................... 301/37.24; 301/37.101
(58) Field of Search .......................... 152/379.3, 399.4, 152/379.5, 394, 381.4, 381.5, 381.6, 405; 301/37.22, 37.24, 37.101

(56) References Cited

U.S. PATENT DOCUMENTS

| | | | | |
|---|---|---|---|---|
| 2,621,979 A | * | 12/1952 | Barnes | 301/37.22 |
| 2,709,472 A | * | 5/1955 | Hofweber | 152/513 |
| 2,915,335 A | * | 12/1959 | Barnes | 301/37.22 |
| 3,006,692 A | * | 10/1961 | Schubert | 301/64.5 |
| 3,930,527 A | * | 1/1976 | French | 152/520 |
| 3,945,419 A | * | 3/1976 | Kosanke | 152/339.1 |
| 4,422,490 A | * | 12/1983 | Power | 152/394 |
| 4,505,314 A | | 3/1985 | Goudy | |
| 4,709,738 A | | 12/1987 | Goodell | |
| 4,797,987 A | | 1/1989 | Bush | |
| 5,000,241 A | | 3/1991 | Patecell | |
| 5,071,684 A | * | 12/1991 | Gewecke | 428/31 |
| 5,232,034 A | * | 8/1993 | Gergele | 152/394 |
| 5,271,443 A | | 12/1993 | Boni et al. | |
| 5,967,212 A | * | 10/1999 | Hameed | 152/379.4 |
| 6,237,662 B1 | * | 5/2001 | Thomasberg | 152/510 |
| 6,286,572 B1 | * | 9/2001 | Chen | 152/84 |

FOREIGN PATENT DOCUMENTS

| | | |
|---|---|---|
| EP | 0 213 335 | 7/1986 |
| EP | 0956977 | 11/1999 |
| WO | WO 9213728 | 8/1992 |
| WO | WO 0232693 | 4/2002 |

* cited by examiner

Primary Examiner—S. Joseph Morano
Assistant Examiner—Long Bao Nguyen
(74) Attorney, Agent, or Firm—Chan Law Group LC; Brett L. Halperin

(57) ABSTRACT

The invention is a vehicle wheel with a removable vehicle wheel ring and vehicle wheel sized and shaped to simulate the look of a bead-lock vehicle wheel. It has the same appearance as an off road bead lock vehicle wheel. This vehicle wheel can be fabricated without modifying an existing wheel and is street legal wheel and capable of mass-production. The wheel is capable of production at a fraction of the cost of an actual bead lock wheel. The wheel can be produced with a matching or contrasting color for the simulated outer bead lock ring. The simulated outer bead lock ring can have a light reflective surface so that the ring will become much more distinguishable when a light source strikes it. The simulated outer bead lock ring has a far greater ease of interchangeability than a conventional bead lock vehicle wheel.

10 Claims, 3 Drawing Sheets

REMOVABLE VEHICLE WHEEL RING

BACKGROUND OF THE INVENTION

1. Field of the Invention

The present invention relates to a removable vehicle wheel ring and vehicle wheel sized and shaped to simulate the look of a bead-lock vehicle wheel.

2. Description of Related Art

Recently, light truck and SUV sales have grown to be about half of all new vehicle sales in the United States. The growth in popularity of these types of vehicles has spurned a similar growth in off-road racing. Off road racers, unlike their street counterparts, improve traction by decreasing tire air pressure significantly below manufacturer pressure limits. Not only does the reduced air pressure tire have a wider footprint, but it more readily bends around road obstacles such as rocks. The off road tires are usually tubeless. At this reduced tire pressure, the tire rim bead may become separated from the wheel resulting in a rapid loss of air pressure.

A solution to the separation problem is to modify the wheel rim by adding an inner and outer bead lock. The bead lock device is used with pneumatic vehicle tires to hold the tire beads against the circumferential flanges of the wheel rim at low tire pressures. The inner bead lock is a metal ring attached to the inner surface of the outer rim of the wheel. It has many internally threaded holes arrayed at equal spaces around its circumference. The outer bead lock is a metal ring with a matching number of holes arrayed to align with the inner bead lock's internally threaded holes. The tire bead is sandwiched between the inner bead lock and the bolted on outer bead lock. The bolts holding the sandwiching rings together must be torque checked frequently. This adds a great deal of maintenance time. When running at reduced tire pressures, the tire bead is clamped in place between the inner and outer bead locks resulting in no tire air pressure losses.

Bead lock wheels can be manufactured by modifying an existing wheel. This process makes these types of wheels very expensive. Since this type of wheel is not street legal, a vehicle owner must also have a set of street legal wheels available and the where-with-all to replace all four wheels. This replacement process is also very expensive. Many vehicle owners who do not race off road would like to have the appearance of an off road wheel in an affordable street legal wheel.

A one-piece wheel with a raised outer rim ring with imitation bolt heads has been manufactured to imitate the bead lock wheel appearance. The one-piece construction makes the wheel look like an obvious and cheap imitation.

The bead lock wheel structure has a distinctive appearance quickly associated with off road racing. An objective of this invention is to achieve the same bead lock appearance on an unmodified, mass-produced, street legal wheel. Another objective is to produce this wheel for a fraction of the cost of an actual bead lock wheel. Yet another objective is to produce a matching or contrasting color simulated outer bead lock. Still another objective is to produce a simulated outer bead lock ring having a light reflective surface so that the ring will become much more distinguishable when a light source strikes it. Another objective is to produce a vehicle wheel ring with far greater ease of interchangeability than a conventional bead lock vehicle wheel ring or a one-piece imitation bead lock wheel. The final objective is to produce a low cost interchangeable simulated outer bead lock ring that a vehicle owner could have in several colors or styles and could mix, match or replace at will. The present invention satisfies these needs, as well as others, and generally overcomes the deficiencies found in the background art.

BRIEF SUMMARY OF THE INVENTION

The invention is a removable vehicle wheel ring. A wheel rim is provided. The wheel rim has an outer rim edge, an inner rim edge and a central connecting portion attached to the outer rim edge and to the inner rim edge. The central connecting portion has an outer surface and an inner surface.

A central disk is provided. The central disk has an outer circumferential edge and hub mounting holes. The central disk is attached onto the vehicle hub by passing an equal number of hub studs through the mounting holes and tightening retaining nuts down the hub studs to impinge against the central disk.

A tire is mounted onto the wheel rim in a conventional manner for a tubeless tire.

The outer rim edge has an inner and an outer surface. The outer surface of the outer rim edge has a plurality of holes arrayed annularly at equal spaces around the outer rim edge. The holes have internal threading.

A ring is provided. The ring has an inner edge, an outer edge, an inner surface, an outer surface, a predetermined thickness and a predetermined width. The ring has a plurality of holes arrayed annularly around the ring in alignment with the plurality of internally threaded holes arrayed annularly at equal spaces around the outer rim edge.

The ring is attached to the outer rim edge by installing bolts through the plurality of holes arrayed annularly around the ring and into the internal threading of the corresponding plurality of holes arrayed annularly at equal spaces around the outer rim edge. There is no need for the frequent bolt torque checks required on a conventional bead lock wheel.

A variation on the removable vehicle wheel ring invention has the ring being colored to match the color of the wheel rim or to match the color of the central disk, or colored differently from the color of the wheel rim or the color of the central disk.

Another variation on the removable vehicle wheel ring invention has the ring being made from aluminum.

Yet another variation on the removable vehicle wheel ring invention has the plurality of holes arrayed annularly around the ring being countersunk on the outer surface or being spot faced on the outer surface.

Still another variation on the removable vehicle wheel ring invention has the ring having a light reflective surface so that the ring will become much more distinguishable when a light source strikes it.

A final variation on the removable vehicle wheel ring invention has the internal threading of the plurality of holes arrayed annularly at equal spaces around the outer rim edge being provided by having steel internally threaded nut inserts installed in each hole.

This invention achieves the objective of having the same appearance as an off road bead lock vehicle wheel. The instant vehicle wheel accomplishes the objective of being fabricated without modifying an existing wheel. The instant vehicle wheel achieves the objective of being a street legal wheel capable of mass-production. The instant vehicle wheel achieves another objective of being capable of production at a fraction of the cost of an actual bead lock wheel. Yet another objective of producing a matching or contrasting color simulated outer bead lock is achieved. Still another objective of producing a simulated outer bead lock ring having a light reflective surface so that the ring will become much more distinguishable when a light source strikes it has been met. The objective to produce a vehicle wheel ring with far greater ease of interchangeability than a conventional bead lock vehicle wheel ring or a one-piece imitation bead lock wheel has been met by this invention. Another objective is to produce a vehicle wheel ring with far greater ease of interchangeability than a conventional bead lock vehicle wheel or a one-piece imitation bead lock wheel. The final objective of producing a low cost inter-changeable simulated outer bead lock ring that a vehicle owner could have in several colors or styles and could mix, match or replace at will has been accomplished.

BRIEF DESCRIPTION OF THE DRAWINGS

The invention will be more fully understood by reference to the following drawings that are for illustrative purposes only.

DETAILED DESCRIPTION

The following description is provided for the purpose of describing an example and specific embodiment of the invention only and is not intended to exhaustively describe all possible examples and embodiments of the invention.

Figure 1:
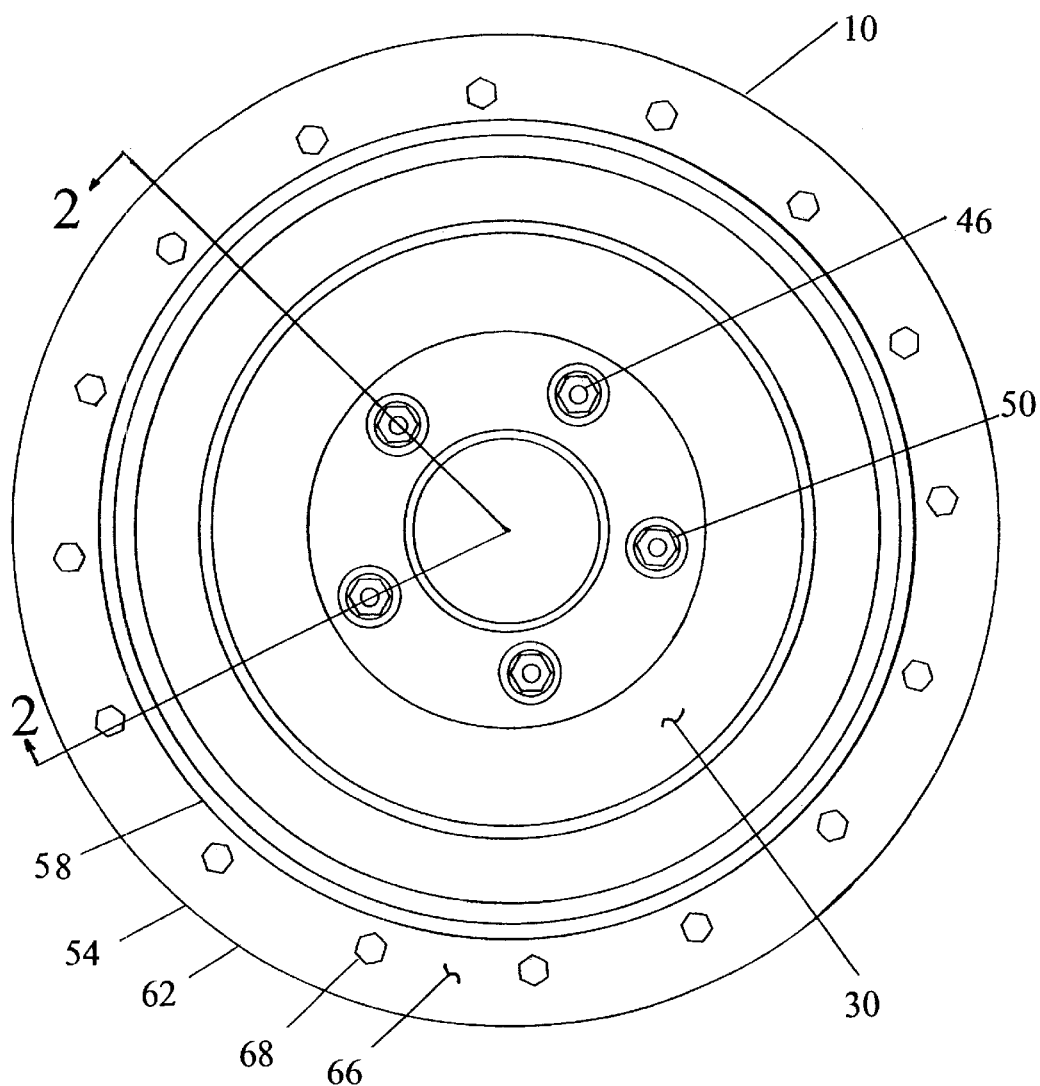
FIG. 1 is a side view of a vehicle wheel with a removable vehicle wheel ring and vehicle wheel sized and shaped to simulate the look of a bead-lock vehicle wheel.
Figure 2:
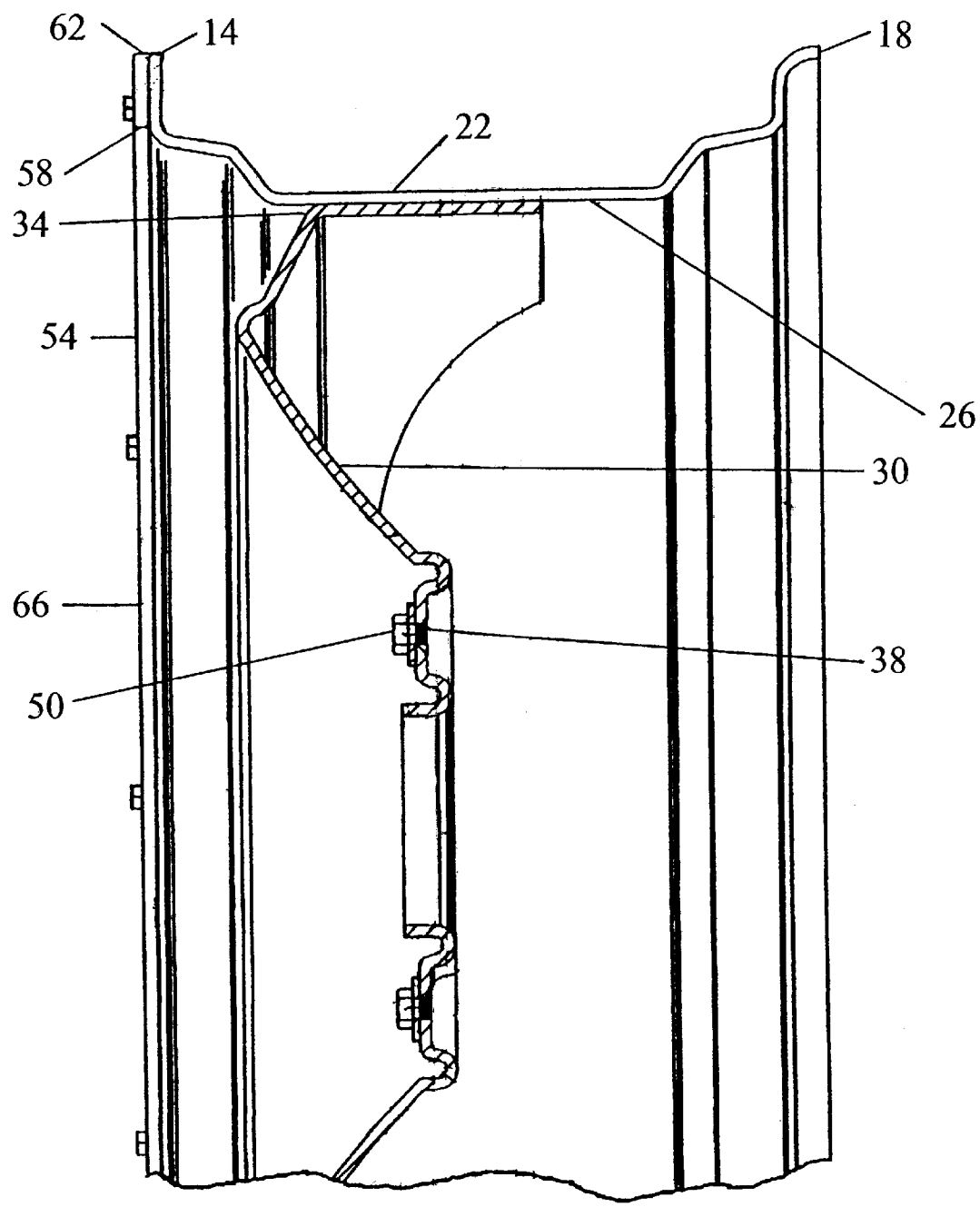
FIG. 2 is a cross sectional view of a vehicle wheel with a removable vehicle wheel ring and vehicle wheel sized and shaped to simulate the look of a bead-lock vehicle wheel.
Figure 3:
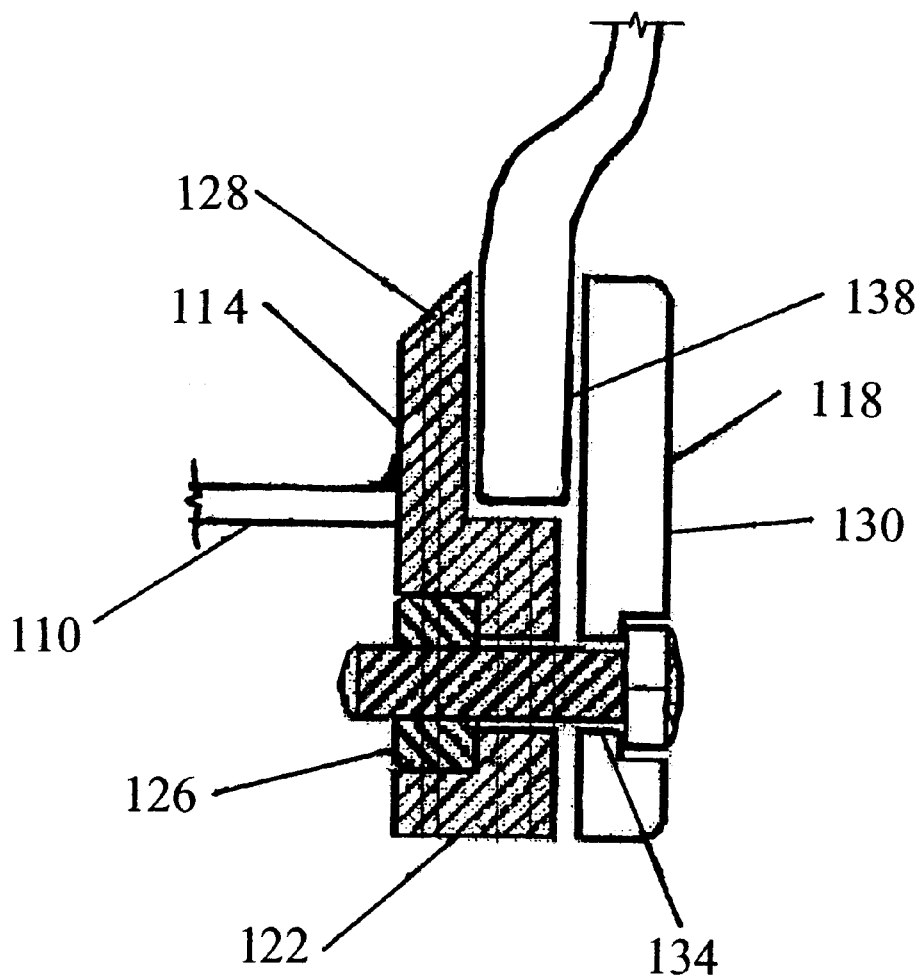
FIG. 3 is a cross sectional view of a prior art bead-lock rim configuration.

Referring more specifically to the drawings, the present invention is embodied in the apparatus generally shown in FIGS. 1 through 3.

FIG. 3 shows a prior art modified wheel rim 110 with an inner 114 and outer bead lock 118 is shown. The inner bead lock 114 is a metal ring 128 attached to the outer rim 122 of the wheel. It has many internally threaded holes 126 arrayed at equal spaces around its circumference. The outer bead lock 118 is a metal ring 130 with a matching number of holes 134 arrayed to align with the inner bead lock's internally threaded holes 126. The tire bead 138 is sandwiched between the inner bead lock 114 and the bolted on outer bead lock 118. When running at reduced tire pressures, the tire bead 138 is clamped in place between the inner 114 and outer bead locks 118 resulting in no tire air pressure losses.

The invention is a removable vehicle wheel ring as shown in FIGS. 1 and 2. A wheel rim 10 is provided. The wheel rim has an outer rim edge 14, an inner rim edge 18 and a central connecting portion 22 attached to the outer rim edge 14 and to the inner rim edge 18. The central connecting portion 22 has an outer surface and an inner surface 26.

A central disk 30 is provided. The central disk 30 has an outer circumferential edge 34 and hub mounting holes 38. The central disk 30 is attached onto the vehicle hub 42 by passing an equal number of hub studs 46 through the mounting holes 38 and tightening retaining nuts 50 down the hub studs 46 to impinge against the central disk 30.

A tire is mounted onto the wheel rim 10 in a conventional manner for a tubeless tire.

The outer rim edge has an inner and an outer surface. The outer surface of the outer rim edge has a plurality of holes arrayed annularly at equal spaces around the outer rim edge. The holes have internal threading.

A ring 54 is provided. The ring 54 has an inner edge 58, an outer edge 62, an inner surface, an outer surface 66, a predetermined thickness and a predetermined width. The ring 54 has a plurality of holes arrayed annularly around the ring in alignment with the plurality of internally threaded holes arrayed annularly at equal spaces around the outer rim edge.

The ring 54 is attached to the outer rim edge by installing bolts 68 through the plurality of holes arrayed annularly around the ring and into the internal threading of the corresponding plurality of holes arrayed annularly at equal spaces around the outer rim edge 14. There is no need for the frequent bolt torque checks required on a conventional bead lock wheel.

A variation on the removable vehicle wheel ring invention has the ring 14 being colored to match the color of the wheel rim 10 or to match the color of the central disk 30, or colored differently from the color of the wheel rim 10 or the color of the central disk 30.

Another variation on the removable vehicle wheel ring invention has the ring 54 being made from aluminum.

Yet another variation on the removable vehicle wheel ring invention has the plurality of holes arrayed annularly around the ring 54 being countersunk on the outer surface 66 or being spot faced on the outer surface 66.

Still another variation on the removable vehicle wheel ring invention has the ring 54 having a light reflective surface so that the ring 54 will become much more distinguishable when a light source strikes it.

A final variation on the removable vehicle wheel ring invention has the internal threading of the plurality of holes arrayed annularly at equal spaces around the outer rim edge 14 being provided by having steel internally threaded nut inserts installed in each hole.

What is claimed is:

1. A removable vehicle wheel ring comprising:

a wheel rim having an outer rim edge, an inner rim edge and a central connecting portion attached to said outer rim edge and to said inner rim edge, said central connecting portion has an outer surface and an inner surface;

a central disk having an outer circumferential edge and a plurality of mounting holes, said central disk being attached onto the vehicle hub by passing an equal number of hub studs through said mounting holes and tightening retaining nuts down the hub studs to impinge against said central disk, said outer circumferential edge being attached to said inner surface of said central connecting portion;

said outer rim edge having an inner and an outer surface, said outer surface of said outer rim edge having a plurality of holes arrayed annularly at equal spaces around said outer rim edge, said holes having internal threading, said holes do not go through said outer rim edge;

a tire being mounted onto said wheel rim in a conventional manner for a tubeless tire;

a ring having an inner edge, an outer edge, an inner surface, an outer surface, a predetermined thickness and a predetermined width, said ring having a plurality of holes arrayed annularly around said ring in alignment with said plurality of holes with internal threading arrayed annularly at equal spaces around said outer rim edge; and said ring being attached to said outer rim edge by installing a bolts through said plurality of holes arrayed annularly around said ring and into said internal threading of the corresponding said plurality of holes arrayed annularly at equal spaces around said outer rim edge.

2. A removable vehicle wheel ring according to claim 1, wherein said ring being colored to match the color of said wheel rim.

3. A removable vehicle wheel ring according to claim 1, wherein said ring being colored to match the color of said central disk.

4. A removable vehicle wheel ring according to claim 1, wherein said ring being a color different from the color of said wheel rim.

5. A removable vehicle wheel ring according to claim 1, wherein said ring being a color different from the color of said central disk.

6. A removable vehicle wheel ring according to claim 1, wherein said ring being made from aluminum.

7. A removable vehicle wheel ring according to claim 1, wherein said plurality of holes arrayed annularly around said ring being countersunk on said outer surface.

8. A removable vehicle wheel ring according to claim 1, wherein said plurality of holes arrayed annularly around said ring being spot faced on said outer surface.

9. A removable vehicle wheel ring according to claim 1, wherein said ring having a light reflective surface so that said ring will become much more distinguishable when a light source strikes it.

10. A removable vehicle wheel ring according to claim 1, wherein said internal threading of said plurality of holes arrayed annularly at equal spaces around said outer rim edge being provided by having steel internally threaded nut inserts installed in each hole.

* * * * *